United States Patent [19]
Yeh

[11] Patent Number: 5,136,456
[45] Date of Patent: Aug. 4, 1992

[54] FAULTED CURRENT INDICATOR WITH PROTECTION AGAINST TEMPORARY OVERLOADS AND TRANSIENTS

[75] Inventor: Thomas Yeh, South Weymouth, Mass.

[73] Assignee: Sigma Instruments, Inc., Weymouth, Mass.

[21] Appl. No.: 438,631

[22] Filed: Nov. 17, 1989

[51] Int. Cl.⁵ .............................. H02H 3/08
[52] U.S. Cl. ........................ 361/63; 361/94; 340/650
[58] Field of Search ........... 361/86, 87, 92, 93, 361/94, 95, 96, 68, 59, 3, 2, 55, 63, 94; 340/650, 664

[56] References Cited

U.S. PATENT DOCUMENTS

| | | | |
|---|---|---|---|
| 3,715,742 | 2/1973 | Schweitzer, Jr. | 361/59 X |
| 3,735,248 | 5/1973 | Reese | 324/51 |
| 4,223,365 | 9/1980 | Moran | 361/71 |
| 4,733,321 | 3/1988 | Lindeperg | 361/96 |
| 4,794,332 | 12/1988 | Schweitzer, Jr. | 324/133 |
| 4,922,363 | 5/1990 | Long et al. | 361/3 |

FOREIGN PATENT DOCUMENTS 2315496 3/1973 Fed. Rep. of Germany .

Primary Examiner—Todd E. DeBoer
Attorney, Agent, or Firm—Stanger, Michaelson, Spivak & Wallace

[57] ABSTRACT

The disclosed faulted current indicator ignores temporary overloads and transients by inhibiting any trip resulting from an overcurrent signal until a disabling circuit senses that a fuse or circuit breaker has reduced the line current to zero.

7 Claims, 3 Drawing Sheets

FAULTED CURRENT INDICATOR WITH PROTECTION AGAINST TEMPORARY OVERLOADS AND TRANSIENTS

RELATED APPLICATIONS

This application is related to the co-pending U.S. Pat. application No. of Thomas Yeh and Joseph R. Thibodeau, Ser. No. 362,063, filed June 6, 1989 now abandoned.

BACKGROUND OF THE INVENTION

This invention relates to faulted current indicators, and particularly to methods and means for displaying a faulted current condition while ignoring temporary overloads and transients.

Faulted current indicators (or FCI's or fault indicators) are placed at intervals along power lines to disclose that a fault has occurred between the indicator and a load. In general, each FCI trips in response to an overcurrent that occurs as a result of a fault between the indicator and the load. The FCI remains in the trip indicating condition even after a current protection device, such as a circuit breaker or a fuse, has responded to the overcurrent by opening the line and ending the current in the line. After the fault has been cured and the current protection device closed to re-energize the line, the FCI resets in response to a minimum operating current.

Such devices often respond unintentionally to temporary overloads and transients. This creates a false indication which prevents maintenance crews from properly caring for the line.

One way of minimizing false operation of FCIs is to set their trip rating abnormally high to allow for transients and temporary overloads. This approach of making the FCIs less responsive trades away the sensitivity of the FCIs to low level currents.

OBJECTS AND SUMMARY OF THE INVENTION

An object of the invention is to improve faulted current indicators.

Another object is to overcome the aforementioned problems.

According to a feature of the invention, such objects are attained by enabling the trip means only if the FCI senses that the current in the line being tested falls below the reset level within a given time after it rises above the trip level.

According to another feature of the invention disabling means disable the trip means after the current has reached the trip value, unless the current indicates that the fuse or circuit breaker protecting the line has operated and decreased the sensed current to substantially zero.

These and other features of the invention are pointed out in the claims. Other objects and advantage of the invention will become evident from the following description when read in light of the accompanying drawings.

DETAILED DESCRIPTION OF PREFERRED EMBODIMENTS

Figure 1:
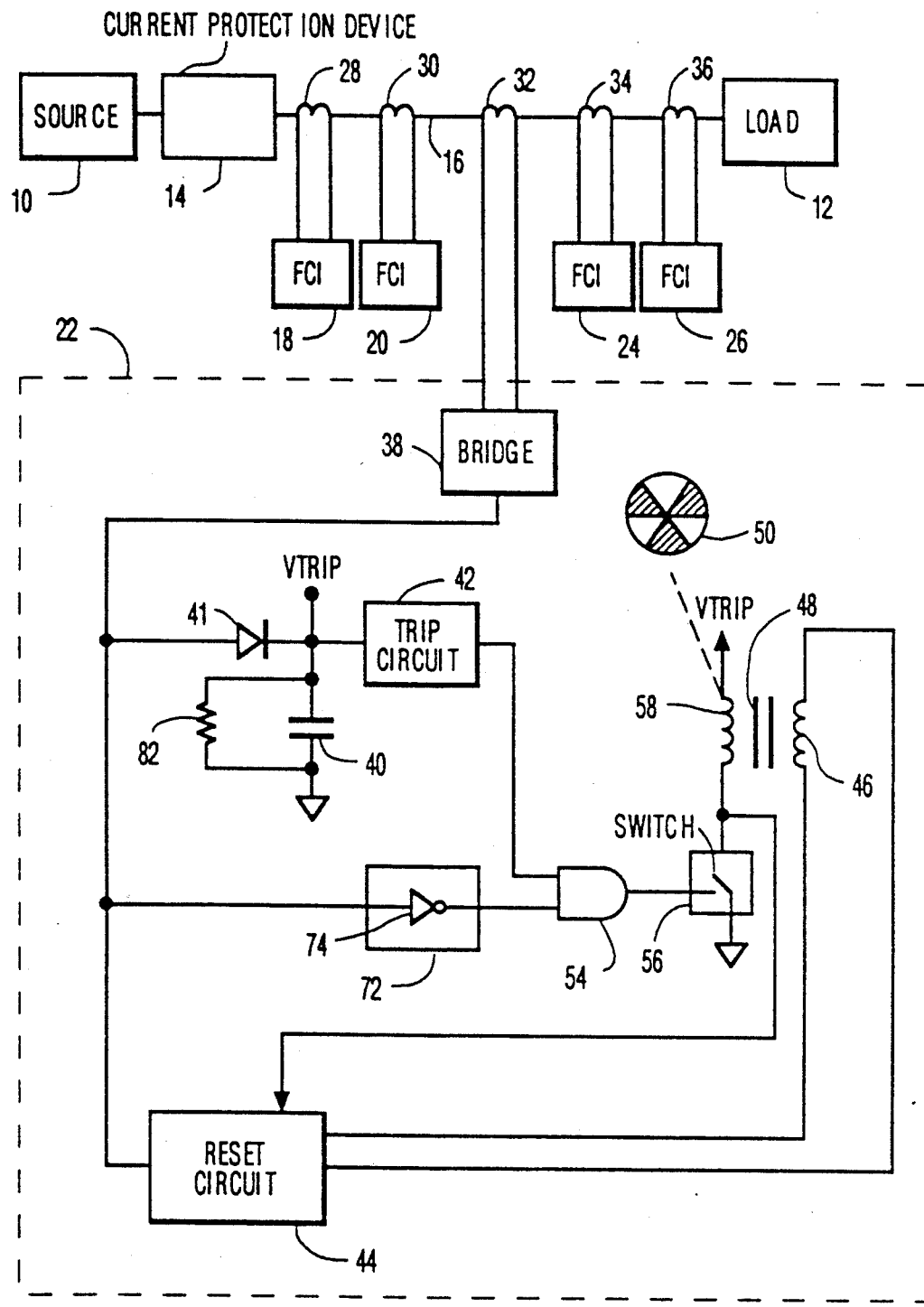
FIG. 1 is a block diagram schematically showing circuit of a system and fault indicator embodying the invention.

FIG. 1 illustrates the invention and its environment. In FIG. 1 a power source 10 energizes a load 12 through a current protection device 14, such as a circuit breaker or a fuse, and a power cable 16. The term cable is being used herein in a generic sense to include current carrying conductor or phase conductor in a power distribution line. Faulted circuit indicators (FCI's) 18, 20, 22, 24, and 26, inductively coupled to the cable 16 by inductive sensors 28, 30, 32, 34, and 36 at spaced locations along the cable, sense whether a fault exits at positions between any FCI's. A fault between the inductive sensor 34 of FCI 24 and the inductive sensor 36 of FCI 26 causes high current to trip FCI's 18 to 24 while leaving FCI 26 reset. This identifies the location of the fault as being between the inductive sensor 34 of FCI 24 and the inductive sensor 36 of FCI 26. The length of the cable 16 appears shortened for purposes of illustration. Although only FCI 22 is shown in detail, it will be understood that the other FCI's are identical thereto.

The inductive sensors 28 to 36 produce respective alternating voltages corresponding in amplitude to the amplitude of the alternating currents they sense in the cable 16. In the FCI 22, a bridge circuit 38 rectifies the sensed alternating voltage to form a direct current waveform proportional to the current flowing in the power cable 16. A capacitor 40 captures the peak value of the rectified voltage through a diode 41. The voltage across the capacitor 40 is thus proportional to the current flowing in the power cable 16. A trip circuit 42 responds to the voltage across the capacitor 40 and a reset circuit 44 with its own internal capacitor operates on the basis of the corresponding voltage across the bridge 38. The trip circuit 42 is set to produce a trip signal when the voltage across the capacitor 40 exceeds a trip voltage Vtrip to indicate that the current in the cable 16 is beyond a trip current Itrip.

The inductive sensor and the bridge circuit 38 serve the dual role of providing the signal proportional to current in the power cable 16 and of furnishing the energy necessary to operate the entire arrangement. According to another embodiment of the invention, a reed switch placed in the electromagnetic field of the power cable 16 gives an indication of excess current and an inductive current sensor and bridge supply the necessary energy. According to still another embodiment, other energy sources such as a battery replace the current sensor and bridge combination.

The reset circuit 44 produces a reset signal in response to a minimum potential Vmin appearing at the output of the bridge 38, and corresponding to a minimum current Imin in the cable 16. The reset signal energizes a reset winding 46 of an electromagnetic fault display actuator 48 which drives a target 50 into a reset position.

A trip signal from the trip circuit 42 passes through an AND gate 54 to turn on an electronic switch 56. The closed switch 56 discharges the capacitor 40 through a trip winding 58 in the actuator 48. The energized trip winding 58 turns the target 50 to the fault condition. At the same time, the switch 56 feeds back the trip signal to the reset circuit 44 to inhibit the reset operation during the trip action.

The FCI of the invention also distinguishes between faults, on the one hand, and overcurrents resulting from temporary overloads and transients that exceed the threshold of the trip circuit, on the other hand. For this purpose, a trip control 72 partially composed of an inverter 74 senses that a fault has opened the current protective device 14 (a fuse or circuit breaker) and reduces the current to zero. When the device 14 does cut off power, the trip control 72 goes high. This enables the AND gate 54 which passes the trip or "current off" signal in the form of a high. The high closes the switch 56 which energizes the winding 58 in the actuator 48. The winding 58 now turns the target 50 to the fault position.

If the sensor 32 senses currents representing temporary overloads or transients, the trip circuit 42 may respond to the output of the bridge 38 and produce of trip signal. However, the transients will not actuate the current protect device 14. Therefore, the input at the control 72 senses a high and output remains low. The low disables the AND gate 54. Accordingly no trip signal can reach the actuator 48 and rotate the target 50. Thus as long as current remains in the cable 16, no trip signal can reach the actuator 48.

The circuit protecting device 14 exhibits an inherent delay much longer than the time for the capacitor 40 and the trip circuit 42 to generate a trip signal in response to a fault, transient, or temporary overload. The low forward resistance of the diode 41 charges the capacitor rapidly enough to allow the the trip circuit 42 to generate a trip signal well before the device 14 causes the current to drop to zero.

The value of the capacitor 40 is sufficiently high to store the energy that drives the trip winding 58 in the actuator 48. At the same time a high resistor 82 across the the capacitor 40 holds the charge on the capacitor long enough for the device 14 to break the circuit and cause the trip control 72 to place a high on the AND gate 54. The control 72 responds virtually immediately to the zero current in the cable 16.

In operation, if the sensor 32 senses normal current in the cable 16 the bridge 38 produces a voltage indicating the normal condition and the reset circuit 44 causes the winding 46 of the actuator 48 to rotate the target 50 into the no-fault position. The bridge 38 charges the capacitor 40 to a voltage corresponding to the normal current. However, this voltage is not sufficient to overcome the threshold or trip voltage in the trip circuit 42 to produce a trip signal.

When the sensor 32 and the bridge 38 sense an overcurrent condition with sufficient energy to open the protection device 14, i. e.g, a fault condition, the capacitor 40 charges to a value greater than the trip voltage. The trip circuit 42 then enables AND gate 54.

When the fault opens the protection device 14, the voltage at the bridge 38 drops to zero to indicate the current loss in the line 16. However, the enabled condition of AND gate 54 continues beyond the zero current in cable 16 and zero voltage at the bridge 38 because the high resistance of the resistor 82 allows only slow decay of the charge on capacitor 40, and the trip signal remains at the output of the trip circuit 42. The trip signal now passes through enabled AND gate 54 to close the switch 56. This produces a signal that inhibits the reset circuit. At the same time, the capacitor 40 discharges through the winding 58 of the actuator 48 which turns the target 50 to the fault indicating position.

If the sensor experiences a temporary overload or transient, i.e. a current sufficient to produce a trip signal at the trip circuit 42, but insufficient to open the protective device 14, the bridge voltage remains high after the transient and control 72 exhibits a low. This disables AND gate 54 and prevents the trip signal from closing the switch 56. The reset circuit 44 then continues to drive the target 50 to the no-fault position.

Figure 2:
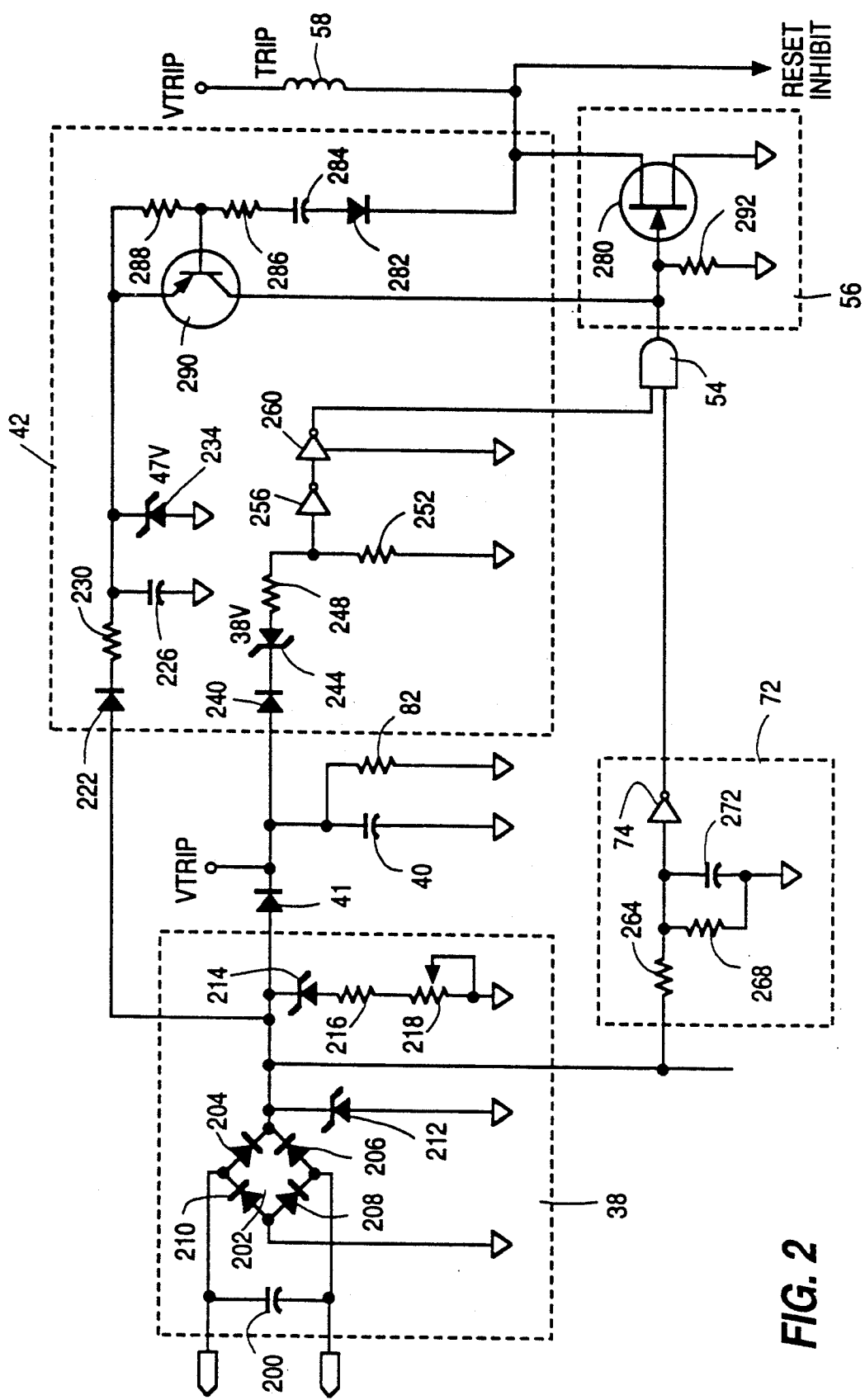
FIG. 2 is a schematic diagram illustrating details of the circuit in FIG. 1

FIG. 2 illustrates details of the bridge 38, the trip circuit 42, the control 72, and the switch 56. In FIG. 2, the bridge 38 includes a shunt capacitor 200, a full wave rectifier 202 composed of diodes 204, 206, 208, and 210 which furnishes full wave rectification of the voltages which the cable 16 induces in the sensor 32. A Zener diode 212 protects the remaining circuitry from excessive voltages which very high currents may induce in the sensor 32.

A Zener diode 214 having a smaller breakdown potential than the Zener diode 212 isolate two loading resistors 216 and 218. This arrangement limits the loading on the rectifier 202 at low potentials of the type that energize the reset circuit 44, but loads the rectifier 202 at higher potentials suitable for operation of the trip circuit 42. The rectifier 202 energizes the trip circuit as well and the reset circuit 44 and the control 72.

In the trip circuit 42, the diode 222 channels the output of the rectifier 202 into a capacitor 226 through an isolating resistor 230. A Zener diode 234 regulates the voltage of the capacitor 226. The capacitor 226 provides the voltage for the various elements of the trip circuit 42 and control 72.

The diode 41 peak detects the output of the full wave rectifier 202 and feed the capacitor 40. The latter captures the peak value of the voltage proportional the the value of the current flowing through the sensor 32. A diode 240 and a Zener diode 244 as well as two voltage dividing resistors 248 and 252 establish the trip potential of the trip circuit 42. The trip potential is effective when the voltage across the resistor 252 exceeds the internal threshold voltage that the CMOS inverter 256 sees as a high input. As is known, a CMOS inverter has one internal threshold that it recognizes as a high, and another lower internal threshold that it recognizes as a low. When the inverter 256 goes low in response to a high input, a second CMOS inverter 260 goes high. The two inverters 256 and 260 serve as a buffer comparator that produces a high output when the line current is above the calibrated trip rating established by the trip circuit 42 for the FCI 22. The output of the trip circuit 42 enables or disables the AND gate 54.

Within the control 72, a voltage divider composed of resistors 264 and 268 apply the output of the full wave rectifier 202 across a smoothing capacitor 272. As long as the voltage across the capacitor 272 exceeds a predetermined value indicative of current flow through the cable 16, the inverter 74 produces a low that prevents the AND gate 54 from turning o the switch 56.

When the voltage output of the rectifier 202 indicates that the cable 16 carries zero current, the inverter 74 goes high. This high occurs virtually immediately and enables the AND gate 54 instantly because the time constant of resistors 264, 268 and capacitor 272 is very small. However, the time constant of the capacitor 40 and resistor 82 is substantially larger, at least 10 times larger, than the time constant of the members 264, 268, and 272 as the capacitor 40 discharges. The time constant of the capacitor 40 and resistor 82 is long enough to allow the trip signal to remain at the output of the inverter 260 longer than the time needed for the protection device 14 to open after the creation of a trip signal.

A high at both inputs of the AND gate 54 renders a field effect transistor (FET) 280 in the switch 56 conductive. This closes a circuit from the terminal VTRIP at the capacitor 40 through a terminal VTRIP at the winding 58 of the actuator 48, through FET 280 to ground. The winding 58 is the actuator 48 then turns the target 50 to the fault indicating condition and sends a low inhibit signal to the reset circuit 44.

In order to assure that the trip signal appearing at the switch 56 remain on long enough to constrain the actuator 48 to turn the target 50 to the fault indicating position, a latch in the trip circuit 42 maintains the FET 280 in its on conditions long enough to allow the actuator to turn the target. In the latch, an isolating diode 282, timing capacitor 284, and two resistors 286 and 288 bias the base of transistor 290. When FET 280 turns on, a base current flows through transistor 290. This turns on the transistor 290 and pulls up the gate of the FET 280. A resistor 292, otherwise holds the gate of the FET 280 at ground potential. The transistor 290 keeps an on bias at the gate of the FET 280 and holds the FET on even after the trip signal at the output of the gate 54 ends.

The on condition of the FET 280 continues until the capacitor 284 changes and raises the base of the transistor 290 to cut off the transistor and thereby drop the voltage at the gate of the FET 54. This makes the FET non-conductive and ends the trip current through the winding 58. The target 58 nevertheless remains in its fault indicating position because it is internally magnetically or mechanically biased into its last actuated position.

The members 41, 42 and 82 are shown as being outside the trip circuit 42. However, they may also be regarded as forming part of the trip circuit.

Figure 3:
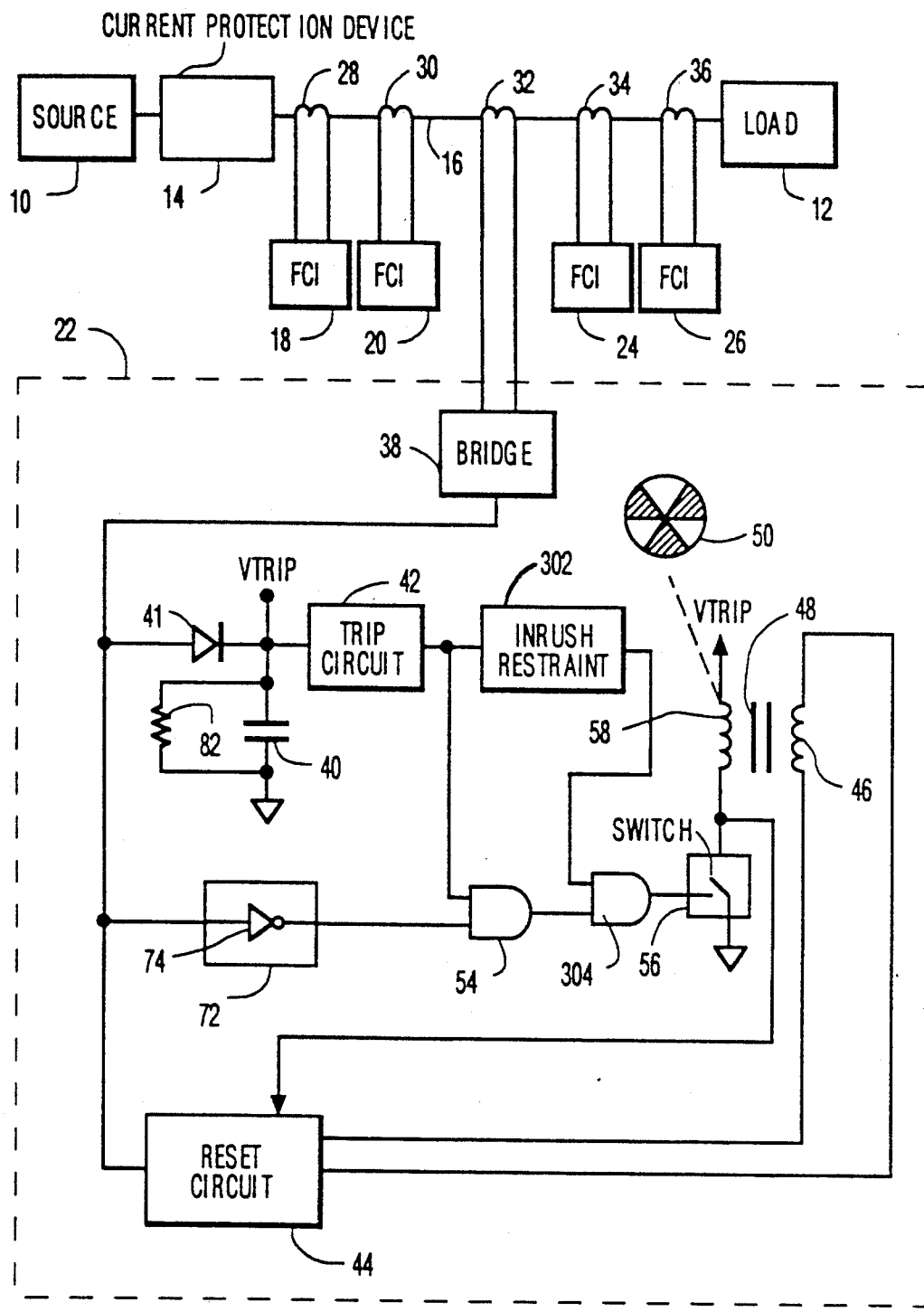
FIG. 3 is a block diagram of another embodiment of the invention.

Another embodiment of the invention is shown in FIG. 3. The circuit in FIG. 3 differs from that in FIG. 1, in that an inrush restraint circuit 302 responds to energization or re-energization of the cable 16 by distinguishing between signals representing inrush currents in the cable 16 and fault currents. The circuit 52 allows and AND gate 304 to pass the trip signal from the gate 54 only if the inrush restraint circuit senses the signal as one representing a fault.

The arrangement according to the invention is able to differentiate between fault overcurrent and temporary overloads as well a transients. The system enhances the trip reliability of the FCI by ignoring temporary overloads and transients while responding to actual faults. The system, in some applications, makes the FCI immune to fault currents in adjacent conductors without expensive shielding or additional spacing to achieve the immunity function. That is, the FCI according to the invention will not operate in response to a high level fault in an adjacent line of a multi-phase system if the protection device in the line itself has not also isolated that line.

The invention prevents false fault indications in response to adjacent faults in a tapped lateral that is fuse protected. The lateral fuse typically has a size to clear before operating the main feeder breaker. The fuse isolates the lateral and prevents the lateral fault from operating the main feeder breaker and cut-off service to the entire feeder circuit. An FCI embodying the invention and installed on the lateral would trip in response to a lateral fault while the FCI installed on the main feeder will continue to show normal. The FCI on the main feeder is effectively immune to the adjacent fault on the lateral.

An FCI according to the invention the trip rating can have a value set for maximum sensitivity while ignoring temporary overloads and transients. This is especially significant for FCIs with time-delayed resets. The two trip requirement for FCIs according to the invention improves the reliability of the FC operation by discriminating between the causes of overcurrents. This offers the lineman patrolling the circuit reason for confidence that the information presented by the FCI is accurate and will lead to the location of the fault.

While embodiments of the invention have been shown in detail it will be evident to those skilled in the art that the invention may be embodied otherwise without departing from its spirit and scope.

What is claimed is:

1. A faulted current indicator, comprising:
reset means for producing a reset signal in response to a first current value in a cable;
trip means for producing a trip signal in response to a second current value higher than the first current value in the cable;
disabling means coupled to said trip means for producing a signal to enable said trip means to produce the trip signal when the current in the cable drops below the first current value within a given time after reaching the second current value and disable the trip signal otherwise.

2. An indicator as in claim 1, wherein:
said trip means includes means to maintain the trip signal longer than the time the current drops from above the second current value to below the first current value.

3. An indicator as in claim 1, wherein:
said disabling means enables said trip means to produce the trip signal when the current in the cable drops from the second value to a value substantially zero within the given time.

4. A faulted current indicator as in claim 1, wherein:
said disabling means includes inrush restraint means for disabling said trip means in response to current inrushes.

5. A faulted current indicator, comprising:
reset means for producing a reset signal in response to a first current value in a cable;
signal producing means for producing a signal in response to the cable exceeding a second current value higher than the first current value in the cable;
distinguishing means coupled to said indicting means and current in the cable for distinguishing between the indications followed by current in the cable dropping below the first current value within a given time and indications followed by current in the cable failing to drop below the first current value within the given time;
and trip signal means responsive to said distinguishing means for producing trip signals only in response to indications followed by cable currents dropping below the first current value within the given time, and for disabling the trip signals at all other times.

6. A faulted current indicator as in claim 5 wherein:
said distinguishing means further includes inrush restraint means for preventing said trip signal means from producing a trip signal when said indicating means responds to current inrushes.

7. An indicator as in claim 5, wherein:
said indicating means includes means to maintain the indication longer than the time the current drops from above the second current value to below the first current value.

* * * * *